United States Patent [19]

Yen

[11] Patent Number: 5,272,586
[45] Date of Patent: Dec. 21, 1993

[54] TECHNIQUE FOR IMPROVING ESD IMMUNITY

[75] Inventor: Yung-Chau Yen, San Jose, Calif.

[73] Assignee: National Semiconductor Corporation, Santa Clara, Calif.

[21] Appl. No.: 647,740

[22] Filed: Jan. 29, 1991

[51] Int. Cl.⁵ .............................................. H02H 9/04
[52] U.S. Cl. ..................... 361/111; 361/58; 361/91; 257/356; 257/360
[58] Field of Search ............... 357/23.13, 13, 93, 38, 357/39; 361/56, 56, 91, 111; 257/355, 356, 357, 360, 361

[56] References Cited

U.S. PATENT DOCUMENTS

| | | | |
|---|---|---|---|
| 4,449,158 | 5/1984 | Taira | 361/91 |
| 4,527,213 | 7/1985 | Ariizumi | 361/56 |
| 4,630,162 | 12/1986 | Bell | 361/56 |
| 4,692,834 | 9/1987 | Iwahashi et al. | 361/91 |
| 4,819,047 | 4/1989 | Gilfeather et al. | 357/23.13 |
| 4,890,187 | 12/1989 | Tailliet et al. | 361/111 |
| 4,896,243 | 1/1990 | Chatterjee et al. | 362/91 |
| 5,111,262 | 5/1992 | Chen et al. | 357/23.13 |

FOREIGN PATENT DOCUMENTS

| | | |
|---|---|---|
| 0055552 | 7/1982 | European Pat. Off. . |
| 0169559 | 1/1986 | European Pat. Off. . |
| 0257774 | 3/1988 | European Pat. Off. . |
| 0291242 | 11/1988 | European Pat. Off. . |
| 87/02511 | 4/1987 | PCT Int'l Appl. . |

*Primary Examiner*—Todd E. DeBoer
*Attorney, Agent, or Firm*—Limbach & Limbach

[57] ABSTRACT

Proper operation of an integrated circuit (IC) is destroyed when voltage exceeding a predetermined level is applied to the circuit. A switching MOS transistor utilizing floating gate technology is used to shunt electrostatic discharge (ESD) away from the IC. The switching MOS transistor is adapted to switch at a voltage level which is greater than the normal operating voltage for the IC but less than the predetermined voltage level characteristic of the IC. A first switching MOS transistor provides a path for a positive ESD stress by having its control gate and drain connected to the line of interest and its source connected to a reference point. Thus, when a positive voltage spike greater than the circuit voltages occurs on the line of interest, the first switching MOS transistor shunts the ESD stress away from the line of interest. A second switching MOS transistor provides a path for a negative ESD stress by having its control gate and drain connected to the reference point and its source connected to the line of interest. Thus, when a negative voltage spike greater than the circuit voltages occurs on the line of interest, the second switching MOS transistor shunts the ESD stress away from the line of interest.

14 Claims, 4 Drawing Sheets

TECHNIQUE FOR IMPROVING ESD IMMUNITY

BACKGROUND

1. Field of the Invention

The present invention relates generally to protection circuits and, more specifically, to circuitry which protects against electrostatic discharge (ESD) in an integrated circuit.

2. Discussion of the Prior Art

I. Electrostatic Discharge

Electrostatic discharge (ESD) in semiconductor integrated circuits (IC's) is a well-known problem. The inadvertent presence of a sudden voltage spike in an integrated circuit can cause physical destruction of circuit features For example, ESD-induced spikes can rupture the thin oxide gate of field effect transistors (FET's), or degrade P-N junctions, effectively destroying proper IC operation. A typical silicon dioxide gate will rupture when its dielectric strength is more than approximately $10^7$ V/cm.

The most common source of ESD stress is user handling of IC packages. The human body can accumulate a static electric charge as high as 2000 V, or an amount of charge that can easily rupture the gate oxide or other IC features.

The most common method of guarding against ESD is to insert a diode in shunt to the line of interest to provide a resistive path to divert the ESD spike. See, e.g., U.S. Pat. No. 4,890,187 (Tailliet et al) and IBM Technical Disclosure Bulletin, Vol. 22, No. 10. Another solution is to connect a field effect transistor (FET) in shunt to the line of interest and operate it in a gate-controlled drain avalanche breakdown mode. See, e.g., U.S. Pat. No. 4,692,834 (Iwahashi et al). However, these methods have had limited success Typically, they have been used only to protect circuit inputs. Further, as feature size continues to be reduced in IC fabrication, the oxide barrier between the gate and channel of FET's used in the IC becomes ever thinner and breakdown becomes more likely.

II. Floating Gate Transistors

In a conventional FET, application of a sufficient voltage at the control gate causes the channel region to become conductive, and a current flows from source to drain. In a floating gate FET, the same is true, but the voltage required to induce the channel to conduct is substantially higher than in a conventional FET.

FIG. 1a shows the physical structure of a conventional floating gate FET (n-channel). The floating gate FET includes a floating gate 2 which is electrically isolated from control gate 4 by a dielectric region 3, such as layered silicon dioxide. Both gates are electrically isolated from the underlying channel region 9 of the FET by the dielectric region. The channel region 9 is defined by identical n+-type source 6 and drain 8 regions formed in p-type substrate 7. Typically, the source 6 is connected to substrate 7 (usually grounded) and a positive potential is applied to the drain 8 via conductive metal layers connected to the source and drain regions through openings formed in the oxide layer 3. The equivalent circuit symbol is shown in FIG. 1b. It is to be understood, however, that source and drain regions are virtually interchangeable in a FET.

Floating gate transistors are popular for use in memory devices, such as erasable-programmable-read-only-memory (EPROM), due to their ability to retain a charge across the floating gate 2 for long periods of time regardless of whether ordinary circuit voltages are applied to the circuit. This is true because a relatively large voltage (compared to circuit voltages) is required to overcome the oxide barrier and store or release a charge on the floating gate. The charge state is achieved by driving the drain junction to avalanche breakdown, so that high energy electrons will penetrate the thick oxide and become trapped on the floating gate. The charge is erased by shining ultraviolet light onto the device, thereby exciting the trapped electrons and causing them to move off the floating gate.

The floating gate voltage $V_F$ which is required to store a charge on the floating gate can be expressed as
$V_F = V_G * C_2 / (C_1 + C_2)]$,
where $C_1$ = the effective capacitance between the floating gate and the channel;

$C_2$ = the effective capacitance between the floating and control gate; and $V_G$ = the voltage at the control gate. The floating gate voltage $V_F$ may be adjusted during fabrication of the device by using conventional diffusion or ion implantation techniques to adjust the dopant levels in the channel. Alternatively, the ratio of effective capacitances may be adjusted by varying the oxide thickness.

When a sufficient potential $V_G$ is applied at the control gate 4, current is induced to flow across channel 5 from source 6 to drain 8.

A floating gate transistor may thus be used in a novel way, without regard to the charge-injection model just described, to protect against ESD, as will be hereinafter discussed.

SUMMARY OF THE INVENTION

An MOS integrated circuit has circuit features whose proper operation is destroyed by the application of a voltage (ESD stress) exceeding a predetermined level. In accordance with the present invention, the circuit features are protected against ESD stress by switching means adapted to switch at a voltage level which is greater than the normal operating voltage of the integrated circuit but less than the predetermined voltage level of the circuit feature, thus shunting excess voltage away from the circuit feature.

In the preferred embodiment, the switching means utilizes a floating gate transistor construction having a floating gate voltage which is greater than the normal operating voltage of the integrated circuit but slightly less than the predetermined voltage level of the circuit feature. A first floating gate transistor provides a path for a positive ESD stress by having its control gate and drain connected to the line of interest and its source connected to a reference point. Thus, when a positive ESD stress appears on the line of interest, the potential from control gate to source is sufficiently positive to turn on the transistor and induce the channel to conduct, thus shunting the ESD stress to the reference point and away from the line of interest. A second floating gate transistor provides a path for a negative ESD stress by having its control gate and drain connected to the reference point and its source connected to the line of interest. Thus, when a negative ESD stress appears on the line of interest, the source potential is sufficiently below the control gate potential to turn the transistor on and induce the channel to conduct, thus shunting the ESD stress to the reference point and away from the line of interest.

The present invention provides a simple method for diverting ESD stress. By fabricating a floating gate device to switch at a voltage level which is slightly less than the point where proper operation of an MOS device is destroyed, the integrity of the MOS device is protected.

A better understanding of the features and advantages of the present invention will be obtained by reference to the following detailed description of the invention and accompanying drawings which set forth an illustrative embodiment in which the principles of the invention are utilized.

DETAILED DESCRIPTION OF THE INVENTION

In a conventional IC chip package, electrical connections to the circuit are made via bonding pads on the surface of the IC structure. The bonding pads are accessible to the user via pins which extend from the IC chip package. Ordinarily, the IC package will be plugged into a socket on a printed circuit board.

According to the present invention, floating gate transistors shunt the various circuit leads to a reference point (usually ground). The floating gate transistors are constructed according to conventional methods, such as those described above in the Background section. All floating gate transistors are designed to be off during normal IC operation.

Figure 1A:
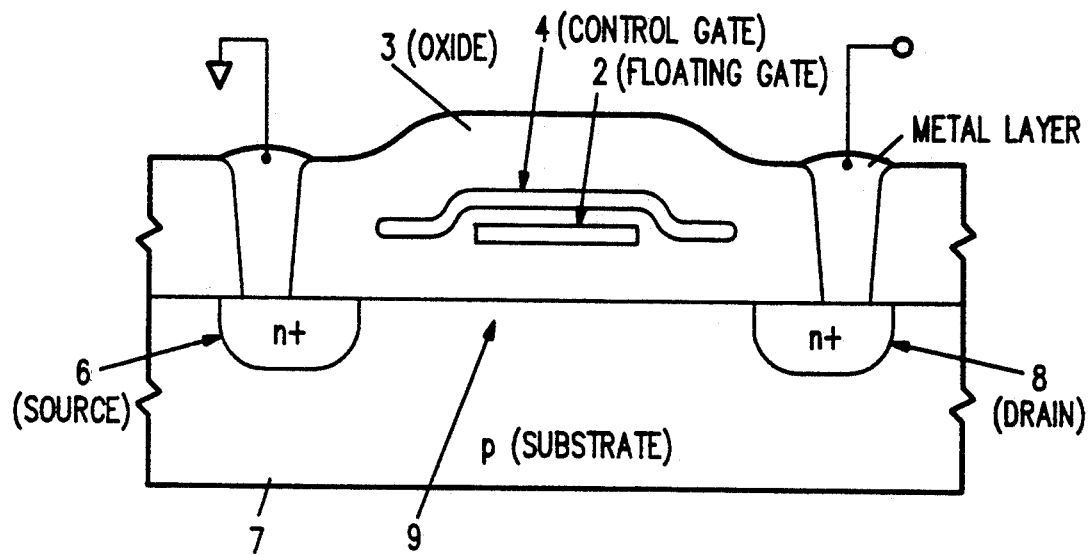
FIG. 1a is a side plan view of a conventional EPROM structure.
Figure 1B:
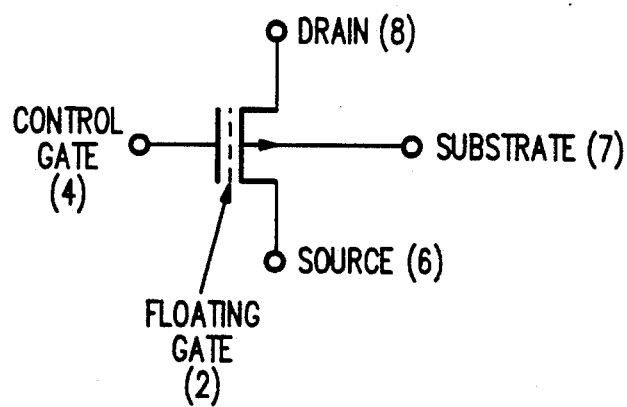
FIG. 1b is a circuit diagram equivalent of the structure of FIG. 1.
Figure 2:
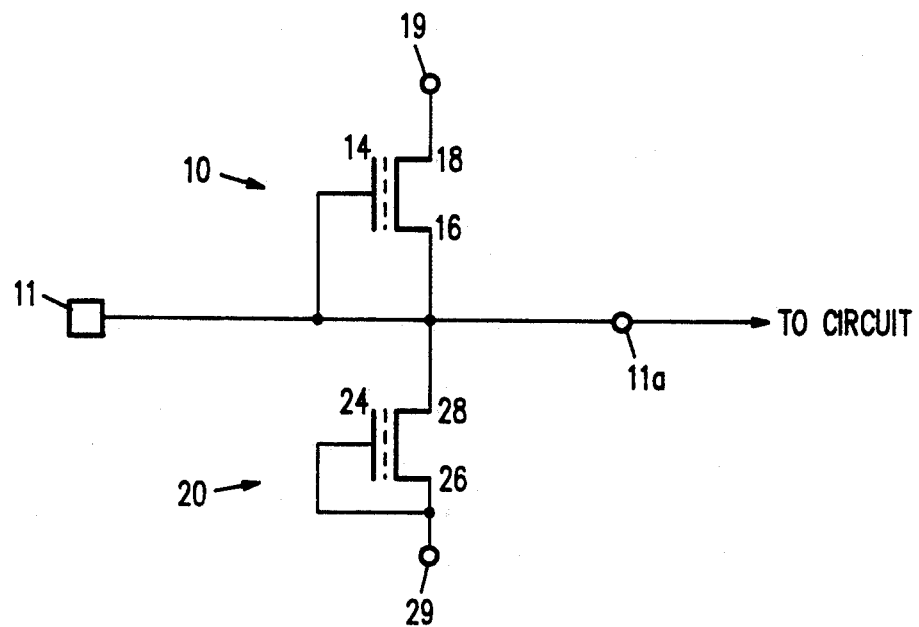
FIG. 2 is a circuit diagram of one aspect of the ESD protection circuit according to the present invention.

Referring now to FIG. 2, an IC package has a bonding pad 11 through which a user has access to the circuit feature which is connected to line 11a. A floating gate transistor 10 has its control gate 14 and drain 16 connected to line 11a and its source 18 connected to node 19. A second floating gate transistor 20 has its control gate 24 and its drain 26 connected to node 29 and its source 28 connected to line 11a.

In a typical application of the structure of FIG. 2, a user provides IC supply voltage $V_{cc}$ through pad 11. Likewise, the user provides IC reference voltage $V_{ss}$ (usually ground) at nodes 19 and 29.

When a positive ESD stress (with respect to $V_{ss}$) appears at pad 11, the potential from control gate 14 to source 18 is sufficiently positive to turn on transistor 10, and the ESD stress is relieved along a conduction path from drain 16 to source 18 to $V_{ss}$ and not to the internal circuitry. However, transistor 20 is off since the potential at control gate 24 is lower than at source 28.

When a negative ESD stress (with respect to $V_{ss}$) appears at pad 11, the potential at source 28 is, dropped sufficiently below that of control gate 24 to turn on transistor 20 thus conducting the ESD stress to $V_{ss}$ and not to the internal circuitry. Since the potential at control gate 14 is less than at source 18, transistor 10 remains off.

Figure 3:
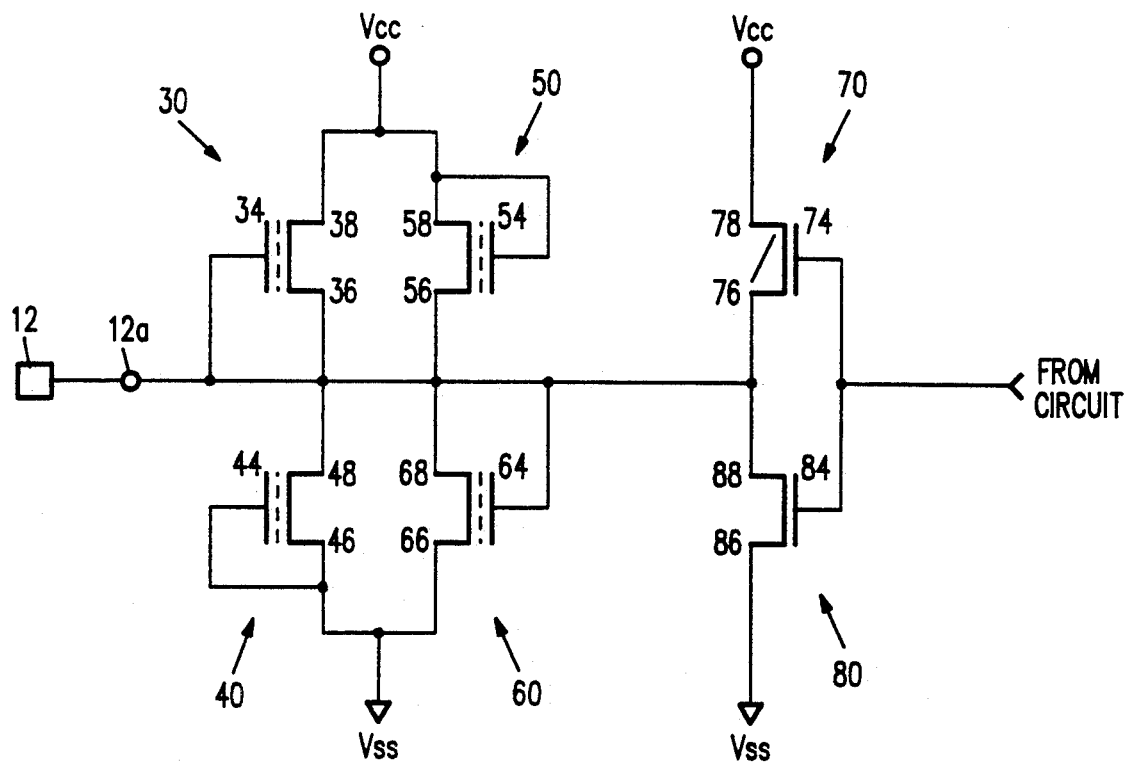
FIG. 3 is a circuit diagram of a second embodiment of the ESD protection circuit according to the present invention.

Referring now to FIG. 3, the IC also has a bonding pad 12 where an output signal from the internal circuitry is presented. According to the present invention, floating gate transistors 30, 40, 50 and 60 are connected along line 12a from pad 12 to protect the internal circuitry from ESD stress which may appear at pad 12. Transistor 30 has its control source 38 connected to $V_{cc}$. Transistor 40 has its control gate 44 and drain 46 connected to $V_s$ and its source 48 connected to line 12a. Transistor 50 has its control gate 54 and drain 58 connected to $V_{cc}$ and its source 56 connected to line 12a. Transistor 60 has its control gate 64 and drain 68 connected to line 12a and its source 66 connected to reference voltage $V_{ss}$.

Transistors 70 and 80 are conventional FET buffer transistors of the type generally associated with output circuits. Transistor 70 is a p-channel FET with its drain 76 connected to line 12a, its source 78 connected to $V_{cc}$ and its gate 74 driven by the circuit. Transistor 80 is an n-channel FET with its source 86 tied to $V_{ss}$, its drain 88 tied to line 12a and its gate 84 connected to the circuit.

When a positive ESD stress (with respect to $V_{ss}$) appears at pad 12, a large positive potential exists from control gate 64 to source 66, sufficient to turn on transistor 60. Thus, the ESD stress is conducted from drain 68 to source 66 to $V_{ss}$, and not to the internal circuitry. Since the potential at control gate 44 is less than at source 48, transistor 40 remains off.

When a negative ESD stress (with respect to $V_{ss}$) appears at pad 12, the potential at source 48 is dropped sufficiently below that of control gate 44 to turn on transistor 40, thus conducting the ESD stress from pad 12 to source 48 to drain 46 to $V_{ss}$, and not to the internal circuitry. Likewise, the potential at control gate 64 is less than at source 66, and transistor 60 remains off.

When a positive ESD stress (with respect to $V_{cc}$) appears at pad 12, a large positive potential exists from control gate 34 to source 38, sufficient to turn on transistor 30. Thus, the ESD stress is conducted from drain 36 to source 38 to $V_{cc}$ and not to the internal circuitry. Since the potential at control gate 54 is less than at source 56, transistor 50 remains off.

When a negative ESD stress (with respect to $V_{cc}$) appears at pad 12, control gate 54 is at a higher potential than source 56 and transistor 50 turns on, thus conducting the ESD stress from source 56 to drain 58 to line 11a, and not to the internal circuitry. Since the potential of control gate 34 is less than at source 38, transistor 30 remains off.

Figure 4:
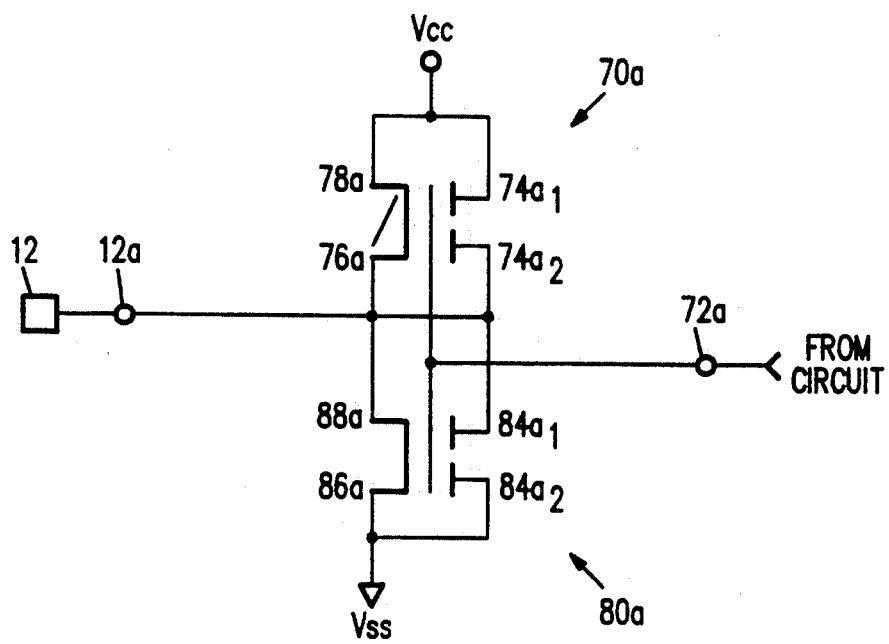
FIG. 4 is a circuit diagram of an alternative embodiment of the second aspect of the ESD protection circuit according to the present invention.

Referring now to FIG. 4, an alternative embodiment for ESD protection of output circuits is shown. The conventional buffer transistors 70 and 80 of FIG. 3 may be modified to take advantage of the floating gate principle in a simplified fabrication. Rather than having a true floating gate, transistors 70a and 80a use the circuit connection 72a to simulate a floating gate. Additionally, transistors 70a and 80a each have two control gates. Otherwise, the fabrication methods are conventional.

Transistor 70a is a p-channel FET with its drain 76a connected to line 12a, source 78a connected to $V_{cc}$, first gate $74a_1$ tied to $V_{cc}$, and second gate $74a_2$ is tied to line 12a. Transistor 80a is a n-channel FET with its source 86a connected to $V_{ss}$, drain 88a connected to line 12a, first gate $84a_1$ tied to line 12a, and second gate $84a_2$ is tied to $V_{ss}$. The source and drain functions of transistors 70a and 80a are interchanged depending on which control gate is energized.

When a positive ESD stress (with respect to $V_{ss}$) appears at pad 12, the potential from gate $84a_1$ to source 86a is sufficiently positive to turn on transistor 80a, and the ESD stress is conducted from drain 88a to source 86a to $V_{ss}$.

When a negative ESD stress (with respect to $V_{ss}$) appears at pad 12, drain 88a acts as a source by being dropped in potential below control gate $84a_2$ enough to turn on transistor 80a, and the stress is conducted from source 88a to drain 86a to $V_{ss}$.

When a positive ESD stress (with respect to $V_{cc}$) appears at pad 12, the potential from source 76a to gate 74a is sufficient to turn on transistor 70a (p-channel device), and the ESD stress is conducted from drain 76a to source 78a to $V_{cc}$.

When a negative ESD stress (with respect to $V_{cc}$) appears at pad 12, gate $74a_2$ is at a lower potential than source 78a. Therefore transistor 70a is turned on and the ESD stress is conducted from drain 76a to source 78a to $V_{cc}$.

Figure 5:
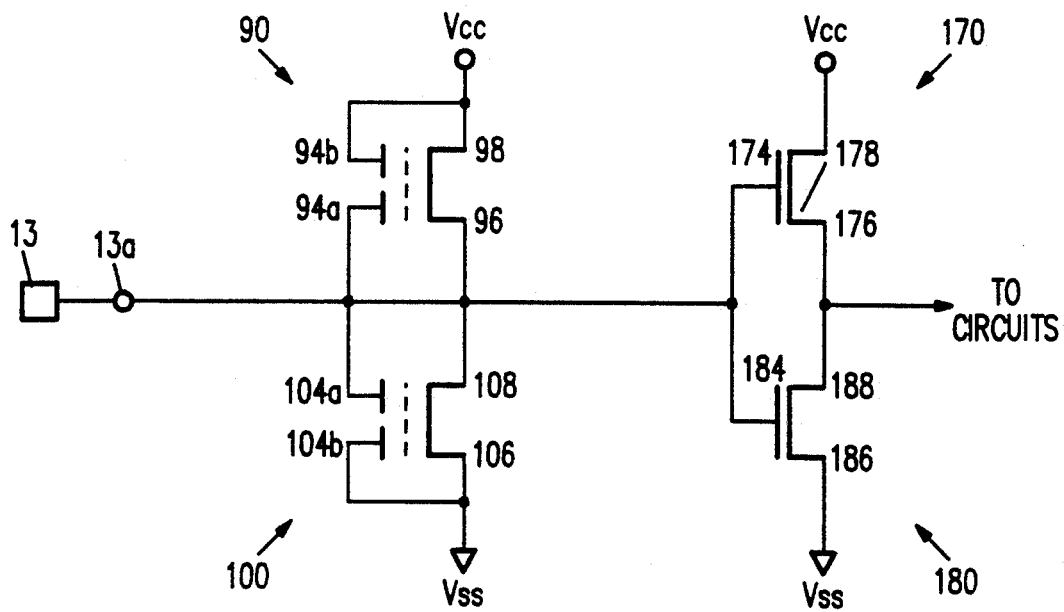
FIG. 5 is a circuit diagram of a third aspect of the ESD protection circuit according to the present invention.

Referring now to FIG. 5, the IC also has a bonding pad 13 where an input signal to the internal circuitry is presented. According to the present invention, transistor 90 has two control gates 94a and 94b. Control gate 94a is connected to line 13a, control gate 94b is connected to $V_{cc}$, source 96 is tied to line 13a, and drain 98 is tied to $V_{cc}$. Transistor 100 has control gate 104a tied to line 13a, control gate 104b tied to $V_{ss}$, source 106 connected to $V_{ss}$, and drain 108 connected to line 13a. The source and drain functions of transistors 90 and 100 are interchanged depending on which control gate is energized.

Buffer transistors 170 and 180 are conventional buffer transistors typically associated with input circuits. Transistor 170 is a p-channel FET with its drain 176 connected to the circuit, its source 178 connected to $V_{cc}$, and its gate 174 tied to line 13a. Transistor 180 is an n-channel FET with its source 186 tied to $V_{ss}$, its drain 188 connected to the circuit, and its gate 184 connected to line 13a.

When a positive ESD stress (with respect to $V_{ss}$) appears at pad 13, control gate 104a is at a higher potential than source 106, and transistor 100 turns on, conducting the ESD stress from drain 108 to source 106 to $V_{ss}$.

When a negative ESD stress (with respect to $V_{ss}$) appears at pad 13, the potential at source 108 is dropped sufficiently below that of control gate 104b to turn on transistor 100 and the ESD stress is conducted from source 108 to drain 106 to $V_{ss}$.

When a positive ESD stress (with respect to $V_{cc}$) appears at pad 13, control gate 94a is at a higher potential than source 98 (interchanged), and transistor 90 turns on, conducting the ESD stress from drain 96 (interchanged) to source 98 to line 13a.

When a negative ESD stress (with respect to $V_{cc}$) appears at pad 13, control gate 94b is at a higher potential than source 96, and transistor 90 turns on, conducting the ESD stress from source 96 to drain 98 to $V_{cc}$.

Figure 6:
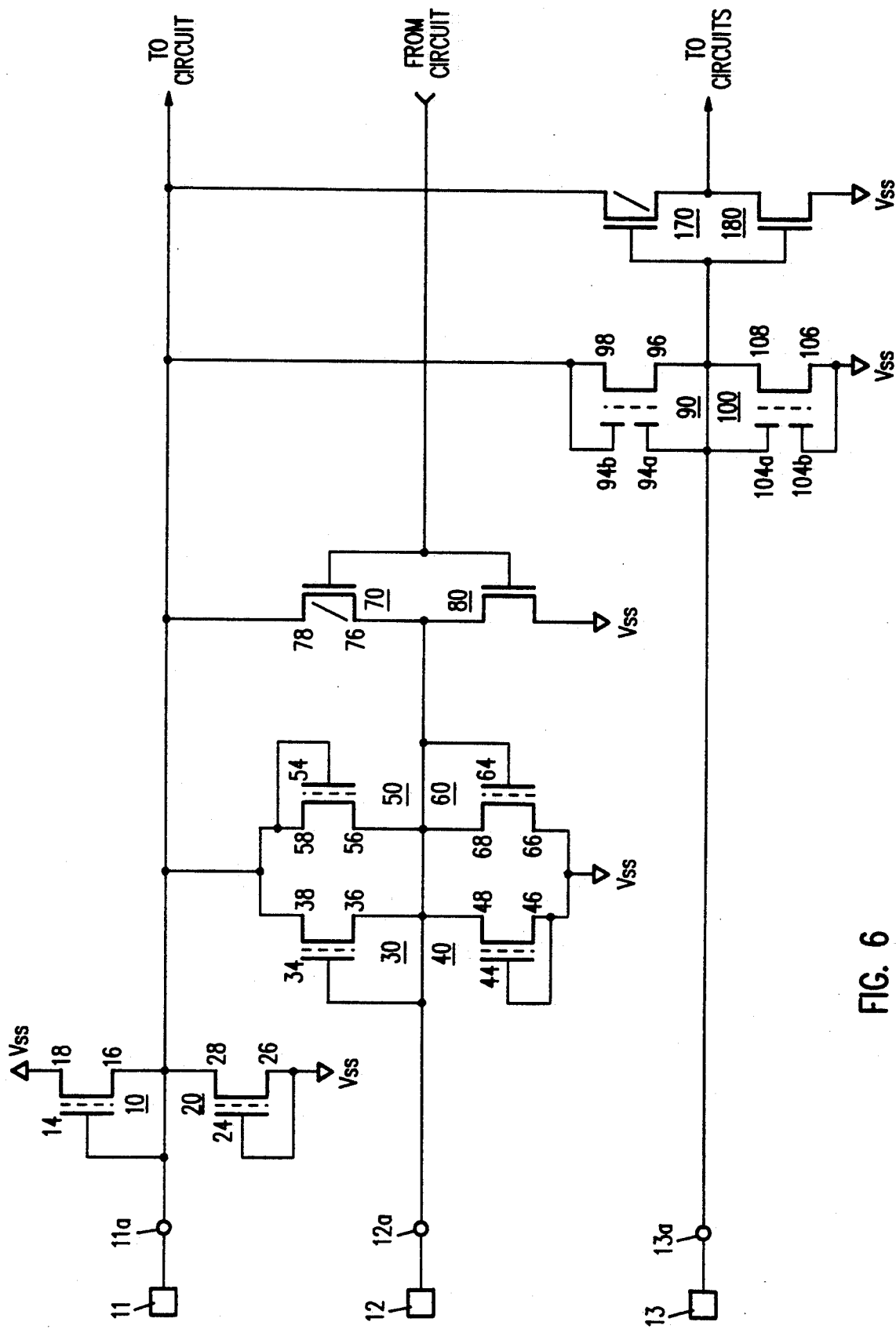
FIG. 6 is a circuit diagram of the preferred embodiment of an ESD protection circuit according to the present invention.

Referring now to FIG. 6, a portion of the IC having bonding pads 11, 12 and 13 and corresponding ESD stress protection circuits as described above in FIGS. 2, 3 and 5 is shown. Transistors 10 and 20 are connected between $V_{ss}$ and $V_{cc}$ as described above with reference to FIG. 2. Line 11a is the $V_{cc}$ line. Transistors 30, 50 and 70 are connected between $V_{cc}$ and line 12a and transistors 40, 60, and 80 are connected between $V_{ss}$ and line 12a, as described above with reference to FIG. 3. Transistors 90 and 170 are connected between $V_{ss}$ and line 13a and transistors 100 and 180 are connected between $V_{ss}$ and line 13a, as described above with reference to FIG. 5. It is, of course, to be understood that typical chip packages have a plurality of other circuits which are accessible via bonding pads, each of which can be protected against ESD stress by the circuits and methods herein described.

The description of FIGS. 2, 3 and 5 above describe the primary conduction paths for each type of circuit. However, from FIG. 6, it is clear that there are interdependencies of the three types of circuits in a typical IC, such that alternative conduction paths are provided. It should also be clear that some of the transistors will be forward-biased under a particular set of conditions, providing a conduction path to the substrate. For example, a n-channel transistor will be forward biased by a negative ESD stress in a conventional manner. However, such conventional ESD protection methods are not discussed herein, since the present invention is directed to the use of floating gate transistor technology in a novel way, not as EPROM-type memory devices, but as shunts for ESD stress.

When a positive ESD stress (with respect to $V_{ss}$) appears at pad 11, control gate 54 is at a higher potential than source 56 and transistor 50 turns on, conducting the stress from drain 58 to source 56 to line 12a. Control gate 64 is now at a higher potential than source 66 and transistor 60 turns on, conducting the ESD stress from drain 68 to source 66 to $V_{ss}$.

Likewise, control gate 94b is at a higher potential than source 96 and transistor 90 turns on, conducting the stress from drain 98 to source 96 to line 13a. Control gate 104a is now at a higher potential than source 106 and transistor 100 turns on, conducting the ESD stress from drain 108 to source 106 to $V_{ss}$.

When a negative ESD stress (with respect to $V_{ss}$) appears at pad 11, control gate 34 is placed at a higher potential than source 38 and transistor 30 turns on. The ESD stress is thus conducted from source 38 to drain 36 to line 12a. Control gate 44 is now at a higher potential than source 48, and transistor 40 is turned on. Therefore, the ESD stress is conducted from source 48 to drain 46 to $V_{ss}$.

The negative pulse is also present at source 98, thus control gate 94a is at a higher potential than source 98, and transistor 90 turns on. The ESD stress is thus conducted from source 98 to drain 96 to line 13a. The potential at source 108 is now dropped sufficiently below that of control gate 104b to turn on transistor 100 on. Therefore, the ESD stress is conducted from source 108 to drain 106 to $V_{ss}$.

When a positive ESD stress appears (with respect to $V_{ss}$) appears at pad 12, control gate 34 is at a higher potential than source 38 and transistor 30 turns on, conducting the ESD stress from drain 36 to source 38 to line 11a. There, the potential presented at control gate 14 is still sufficient to turn on transistor 10, conducting the ESD stress from drain 16 to source 18 to $V_{ss}$.

Additionally, the drain 76 of p-channel transistor 70 is forward biased. Thus, the ESD stress is conducted from source 76 to drain 78 to line 11a, and then through transistor 10 to $V_{ss}$ as just described.

When a positive ESD stress (with regard to $V_{cc}$) appears at pad 12, control gate 64 is at a higher potential than source 66, and transistor 60 turns on, conducting the ESD stress to $V_{ss}$. Since source 26 and control gate 24 are connected to $V_{ss}$, the potential from control gate 24 to drain 28 is sufficient to turn on transistor 20, and the ESD stress is conducted from drain 26 to source 28 to line 11a, the $V_{cc}$ line.

It should be understood that the invention is not intended to be limited by the specifics of the above-described embodiment, but rather defined by the accompanying claims.

I claim:

1. A device which has immunity to electrostatic discharge, the device comprising:
   a. an MOS integrated circuit having at least one circuit feature accessible by a branch line, wherein proper operation of the circuit feature is destroyed when a first voltage exceeding a predetermined voltage level appears on the branch line; and
   b. an MOS transistor connected to the branch line and responsive to a second voltage which is above a normal operating voltage for the integrated circuit but less than the predetermined voltage level for shunting the first voltage away from the circuit feature, said MOS transistor comprising a source, a drain, a control gate, and a floating gate, wherein the control gate is electrically connected to the drain, and the source is connected to a reference voltage such that the transistor will switch when the positive potential form control gate to source is greater than or equal to the second voltage.

2. The device of claim 1, wherein the switching MOS transistor comprises a control gate, a floating gate, a source, and a drain, and wherein the control gate is electrically connected to the drain, and wherein the transistor is designed to switch when the positive potential from control gate to source is greater than or equal to the second voltage.

3. The circuit of claim 1, wherein the branch line provides a supply voltage to the integrated circuit.

4. The circuit of claim 1, wherein the branch line carries a logic level input signal to the integrated circuit.

5. The circuit of claim 1, wherein the branch line carries a logic level output signal from the integrated circuit.

6. A circuit for protecting against electrostatic discharge in a branch line which carries supply voltage to an MOS integrated circuit feature, wherein the proper operation of the circuit feature is destroyed when a first voltage exceeding a predetermined voltage level appears on the branch line, the circuit comprising:
   a. a first switching MOS transistor having a first control gate, a first floating gate, a first source, and a first drain, wherein the first control gate and first drain are connected to the branch line, and wherein the first source is connected to a reference point; and
   b. a second switching MOS transistor having a second control gate, a second floating gate, a second source, and a second drain, wherein the second control gate and the second drain are connected to the reference point, and wherein the second source is connected to the branch line, wherein each of the first and second switching MOS transistors is designed to switch when a positive potential having a magnitude greater than a normal operating voltage for the integrated circuit but less than the predetermined voltage exists from control gate to source in the respective transistors, such that when the first voltage is a positive pulse, the first control gate potential is raised sufficiently above the first source potential that the first switching MOS transistor switches to conduct the first voltage to the reference point and away from the circuit feature, and such that when the first voltage is a negative pulse, the second source potential is dropped sufficiently below the second control gate potential that the second switching MOS transistor switches to conduct the first voltage to the reference point and away from the circuit feature.

7. A circuit for protecting against electrostatic discharge in a branch line which is coupled to an output line from an MOS integrated circuit feature, wherein the proper operation of the circuit feature is destroyed when a first voltage exceeding a predetermined voltage level appears on the branch line, the circuit comprising:
   a. a first switching MOS transistor having a first control gate, a first floating gate, a first source, and a first drain, wherein the first control gate and first drain are connected to the branch line, and wherein the first source is connected to a first reference point;
   b. a second switching MOS transistor having a second control gate, a second floating gate, a second source, and a second drain, wherein the second control gate and the second drain are connected to a second reference point, and wherein the second source is connected to the branch line;
   c. a third switching MOS transistor having a third control gate, a third floating gate, a third source, and a third drain, wherein the third control gate and third drain are connected to the branch line, and wherein the third source is connected to the second reference point; and
   d. a fourth switching MOS transistor having a fourth control gate, a fourth floating gate, a fourth source, and a fourth drain wherein the fourth control gate and the fourth drain are connected to the first reference point, and wherein the fourth source is connected to the branch line, wherein each of the first, second, third, and fourth switching MOS transistors is designed to switch when a positive potential having a magnitude greater than a normal operating voltage for the integrated circuit but less than the predetermined voltage exists from control gate to, source in the respective transistors, such that when the first voltage is a positive pulse, the first control gate potential is raised sufficiently above the first source potential that the first switching MOS transistor switches to conduct the first voltage to the first reference point and away from the circuit feature, and the third control gate potential is raised sufficiently above the third source potential that the third switching MOS transistor switches to conduct the first voltage to the second reference point and away from the circuit feature, and such that when the first voltage is a negative pulse, the second source potential is dropped sufficiently below the second control gate potential that the second switching MOS transistor switches to conduct the first voltage to the second reference point and away from the circuit feature, and the fourth source potential is dropped sufficiently below the fourth control gate potential that the fourth switching MOS transistor switches to conduct the first voltage to the first reference point and away from the circuit feature.

8. The circuit of claim 7, further comprising an output buffer for coupling the branch line to the output line.

9. The circuit of claim 8, wherein the output buffer comprises:
   a. a p-channel field effect transistor having a fifth control gate, a fifth source, and a fifth drain, wherein the fifth drain is connected to the first reference point, the fifth source is connected to the branch line, and the fifth control gate is connected to the output line; and
   b. an n-channel field effect transistor having a sixth control gate, a sixth source, and a sixth drain, wherein the sixth control gate is connected to the output line, the sixth drain is connected to the second reference point, and the sixth source is connected to the branch line.

10. The circuit of claim 7, wherein the first reference point is a circuit supply voltage ($V_{cc}$), and the second reference point is a circuit reference voltage ($V_{ss}$).

11. A circuit for protecting against electrostatic discharge in a branch line which is coupled to an output line from an MOS integrated circuit feature having a characteristic dielectric breakdown voltage, wherein the proper operation of the circuit feature is destroyed when a first voltage exceeding a predetermined voltage level appears on the branch line, the circuit comprising:
   a. a first switching MOS transistor formed in a substrate material of a first-conductivity type, first and second region of a second conductivity type formed in the substrate and separated by a channel of the substrate, a dielectric region formed over the substrate, a first control gate and disposed vertically above the first region in the dielectric region, a second control gate disposed vertically above the second region in the dielectric region, and a third control gate disposed between the substrate and the first and second control gates in the dielectric region, wherein the first control gate and the first region are connected to a first reference point, the second control gate and second region are connected to the branch line, and the third control gate is connected to the output line; and
   b. a second switching MOS transistor formed in a substrate material of a second-conductivity type, a third and fourth region of a first-conductivity type formed in the substrate and separated by a channel of the substrate, a dielectric region formed over the substrate, a fourth control gate disposed vertically above the third region in the dielectric region, a fifth control gate disposed vertically above the fourth region in the dielectric region, and a sixth control gate disposed between the substrate and the fourth and fifth control gates in the dielectric region, wherein the fourth control gate and the third region are connected to a second reference point, the fifth control gate and the fourth region are connected to the branch line, and the sixth control gate is connected to the output line, wherein the first switching MOS transistor is designed to switch when a positive potential having a magnitude greater than a normal operating voltage for the integrated circuit but less than the predetermined voltage exists from the first control gate to the second region, or from the second control gate to the first region, and wherein the second switching MOS transistor is designed to switch when a positive potential having a magnitude less than the predetermined voltage exists from the fourth control gate to the fourth region, or from the fifth control gate to the third region, such that when the first voltage is a positive pulse, the second control gate potential is raised sufficiently above the first region potential that the first switching MOS transistor switches to conduct the first voltage to the first reference point and away from the circuit feature, and the fifth control gate potential is raised sufficiently above the third region potential that the second switching MOS transistor switches to conduct the first voltage to the second reference point and away from the circuit feature, and such that when the first voltage is a negative pulse, the second region potential is dropped sufficiently below the first control gate potential that the first switching MOS transistor switches to conduct the first voltage to the first reference point and away from the circuit feature, and the fourth region potential is dropped sufficiently below the fourth control gate potential that the second switching MOS transistor switches to conduct the first voltage to the second reference point and away from the circuit feature.

12. A circuit for protecting against electrostatic discharge in a branch line which is coupled to an input line of an MOS integrated circuit feature, wherein the proper operation of the circuit feature is destroyed when a voltage exceeding a predetermined voltage level appears on the branch line, the circuit comprising:
   a. a first switching MOS transistor formed in a substrate material of a first-conductivity type, first and second region of a second conductivity type formed in the substrate and separated by a channel of the substrate, a dielectric region formed over the substrate, a first control gate disposed vertically above the first region in the dielectric region, a second control gate disposed vertically above the second region in the dielectric region, a first floating gate formed in the oxide layer and disposed between the substrate and the first and second control gate, wherein the first control gate and the first region are connected to a first reference point, and the second control gate and second region are connected to the branch line; and
   b. a second switching MOS transistor formed in a substrate material of a first-conductivity type, third and fourth region of a second-conductivity type formed in the substrate and separated by a channel of the substrate, a dielectric region formed over the substrate, a third control gate disposed vertically above the third region in the dielectric region, a fourth control gate disposed vertically above the fourth region in the dielectric region, a second floating gate disposed between the substrate and the third and fourth control gate in the dielectric region, wherein the third control gate and the third region are connected to a second reference point, and the fourth control gate and the fourth region are connected to the branch line, wherein the first switching MOS transistor is designed to switch when a positive potential having a magnitude greater than a normal operating voltage for the integrated circuit but less than the predetermined voltage exists from the first control gate to the second region, or from the second control gate to the first region, and wherein the second switching MOS transistor is designed to switch when a positive potential having a magnitude less than the predetermined voltage exists from the third control gate to the fourth region, or from the fourth control gate to the third region, such that when the first voltage is a positive pulse, the second control gate potential is raised sufficiently above the first region potential that the first switching MOS transistor switches to conduct the first voltage to the first reference point and away from the circuit feature, and the fourth control gate potential is raised sufficiently above the third region potential that the second switching MOS transistor switches to conduct the first voltage to the second reference point and away from the circuit feature, and such that when the first voltage is a negative pulse, the second region potential is dropped sufficiently below the first control gate potential that the first switching MOS transistor switches to conduct the first voltage to the first reference point and away from the circuit feature, and the third region potential is dropped sufficiently below the fourth control gate potential that the second switching MOS transistor switches to conduct the first voltage to the second reference point and away from the circuit feature.

13. The circuit of claim 12, further comprising an input buffer for coupling the branch line to the input line.

14. The circuit of claim 13, wherein the input buffer comprises:
  a. a p-channel field effect transistor having a fifth control gate, a first source, and a first drain, wherein the fifth control gate is connected to the branch line, the first source is connected to the second reference point, and the first drain is connected to a input line; and
  b. an n-channel field effect transistor having a sixth control gate, a second source, and a second drain, wherein the sixth control gate is connected to the branch line, the second drain is connected to the first reference point, and the second source is connected to the input line.

* * * * *